H. DENNIS.
STALK PULLING IMPLEMENT.
APPLICATION FILED DEC. 16, 1916.
1,246,562.
Patented Nov. 13, 1917.
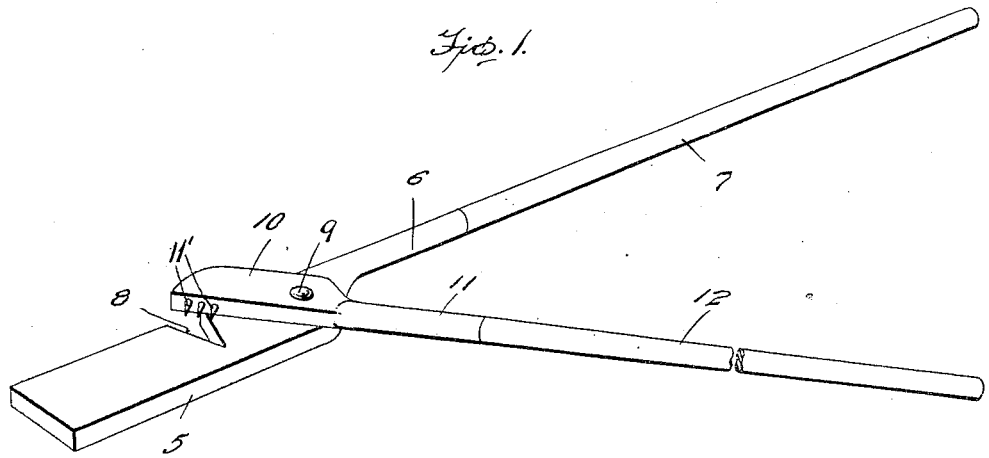
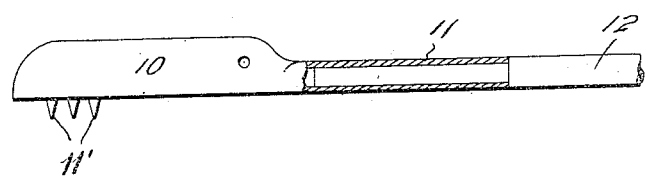
Henry Dennis
Inventor
By Geo. P. Kimmel
Attorney

UNITED STATES PATENT OFFICE.

HENRY DENNIS, OF LOUISE, MISSISSIPPI.

STALK-PULLING IMPLEMENT.

1,246,562. Specification of Letters Patent. Patented Nov. 13, 1917.

Application filed December 16, 1916. Serial No. 137,407.

*To all whom it may concern:*

Be it known that I, HENRY DENNIS, a citizen of the United States, and resident of Louise, in the county of Yazoo and State of Mississippi, have invented certain new and useful Improvements in Stalk-Pulling Implements, of which the following is a specification.

My invention relates to a corn stalk puller and more particularly to a hand implement of this character and has as its primary object to provide a hand implement of this character which can be effectively and easily manipulated.

A further object of the present invention is to provide a corn stalk puller which may be used to pull the stalks desired without danger of harming the stalks in the immediate vicinity.

A further object is to provide an implement of this character which can be operated with little physical effort.

Another object of the invention is to provide an implement for pulling corn stalks which is simple in construction, consists of few parts, which may be placed on the market at a comparatively low cost, and which can be conveniently carried about.

The above and other objects of the invention will be set forth more fully in the following specification, explicitly defined in the appended claims, and illustrated in the accompanying drawings, in which—

Figure 1 shows a perspective view of my improved corn stalk pulling implement, and Fig. 2 is a top of one of the members comprising my implement, parts of which are shown in section.

Referring to the drawing, the numeral 5 designates one of the movable jaws or members which is relatively long and is of uniform width and thickness. This member 5 is formed at one end thereof with a tubular socket 6 which receives one end of a removable handle 7. Formed in one of the longitudinal edges of this movable jaw 5 adjacent the inner end thereof is a relatively large V-shaped notch 8 which is for the purpose of receiving the stalk to be pulled.

Pivotally connected with the jaw 5 upon the upper face thereof by the pivot bolt 9, is a relatively small movable member or jaw 10 which is also formed with a tubular socket 11 that receives a detachable handle 12.

This jaw 10 is of uniform thickness and one edge is curved while its inner longitudinal edge is straight. Secured to this inner longitudinal edge of the jaw 10 at the forward edge thereof is a plurality of barbs 11 that are adapted to engage the stalk and which when the jaws are moved toward each other move over the V-shaped notch 8.

The manner of using my implement is as follows: The stalk to be pulled is engaged adjacent the root thereof in the V-shaped notch 8 and the handles 7 and 12 moved toward each other which will cause the barbs to penetrate the stalk. Now, by simply holding the handles in this position and engaging the forward end of the jaw 5 with the ground and then pulling upwardly on these handles the stalk will be readily extracted.

While I have described and illustrated one form of the invention it is to be understood the form shown is merely illustrative and that the invention can be changed in many different respects that may fairly fall within the limits of the appended claims.

What I claim as new and desire to secure by Letters Patent is:

1. An implement of the character described comprising a pair of pivotally connected jaw members, one of said jaw members being comparatively longer than the other, the longer jaw being provided with a V-shaped notch adapted to receive a stalk member, the other jaw being provided with a plurality of barbs adapted to engage the stalk for a purpose specified.

2. An implement of the character described comprising a pair of pivotally connected jaw members one of said jaw members being comparatively longer than the other, the longer jaw having a notch at one edge thereof adapted to receive the stalk, and handles connected with the jaws, the forward end of the first mentioned jaw being adapted to be engaged with ground whereby upon pulling upwardly on the handles the stalks will be extracted.

3. In a stalk pulling implement, a pair of pivoted jaws, handles connected with the jaws, one of the jaws being provided with a notch to receive the stalk, and barbs carried by the other jaw adapted to engage the stalk upon moving the jaws toward each other.

In testimony whereof, I affix my signature hereto.

HENRY DENNIS.